July 21, 1959  E. D. HOBSON  2,895,883
OIL PURIFICATION OR SEPARATION PLANT
Filed March 31, 1955
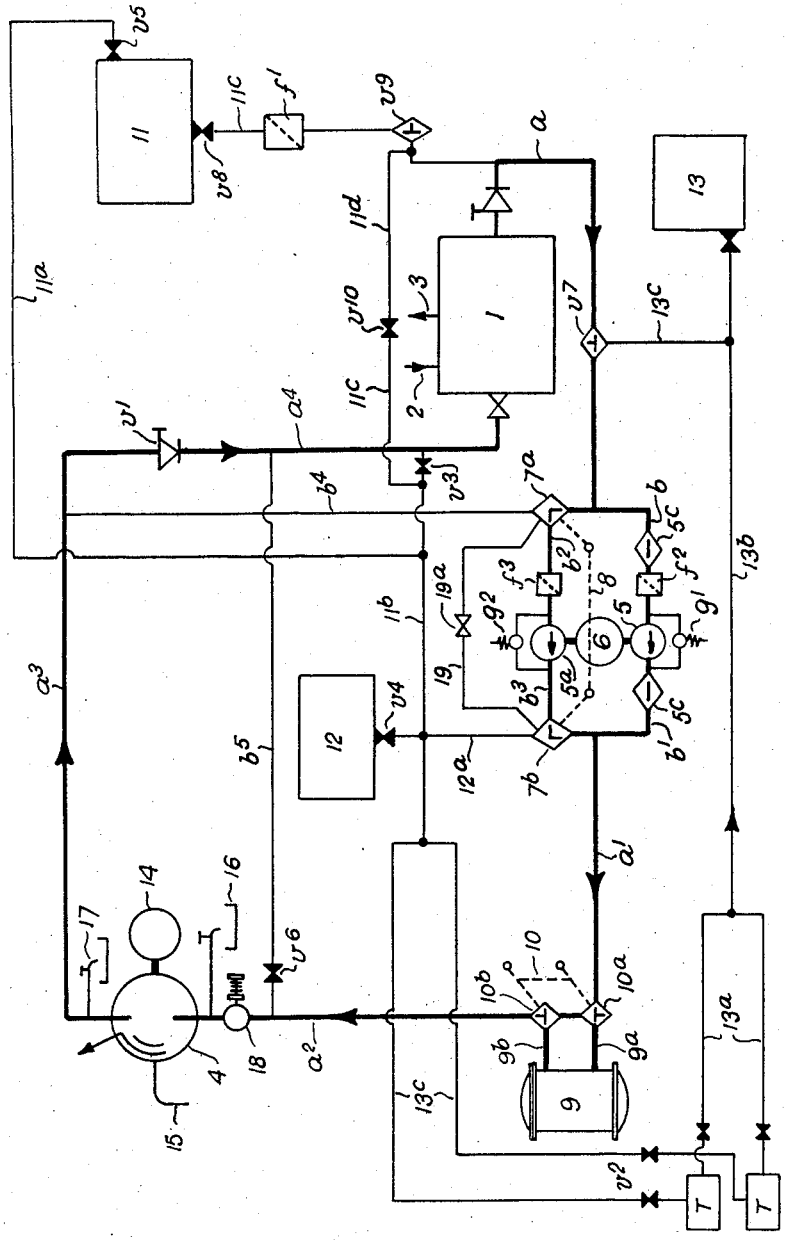
INVENTOR
ERIC DOTT HOBSON
BY Watson, Cole, Grindle & Watson
ATTORNEY

United States Patent Office 2,895,883
Patented July 21, 1959

2,895,883

OIL PURIFICATION OR SEPARATION PLANT

Eric D. Hobson, Shandon, Scotland, assignor to Yarrow and Company Limited, Scotsroun, Glasgow, Scotland Application March 31, 1955, Serial No. 498,416

Claims priority, application Great Britain April 5, 1954

8 Claims. (Cl. 196—46)

This invention relates to oil purification or separation plant for force feed lubricating systems for machinery of the kind wherein either a proportion of the lubricating oil in the system is adapted to be passed continuously through a centrifugal separator to separate any water or other harmful foreign matter which may be entrained in the oil, the purified oil then being recirculated through the lubricating system or alternatively wherein the whole of the oil in the system is passed through the separator and then delivered to a clean oil storage tank or tanks.

In modern machinery installations it is of the utmost importance to maintain the highest possible standard of purity in the lubricating oil at all times, and accordingly the centrifugal separator should be capable of dealing with oil not only when it is at its normal running temperature, that is to say when the machinery is operating, but also when the oil is relatively cold and viscous, for example, when the machinery is idle, and when a reduction may be necessary in the rate of separation, in order to maintain the oil supplied to the separator at the desired temperature.

Heretofore, it has been the usual practice to provide a pump to deliver the oil to the separator; this pump being either incorporated in the separator and driven by the same prime mover or driven independently. The separator and pump are generally operated at constant speeds, the pump speed, and consequently its output, corresponding with the rated throughput of the separator, and when a reduced rate of separation is required a proportion of the pump output would be by-passed from the pump outlet to the pump suction chamber.

In the known arrangement, if the oil, discharged by the separator, could not be returned to the machinery system by gravity, under all conditions of operation, an additional pump had to be provided for this purpose, the output of this pump being not less than the rated throughput of the separator. A drawback of this known arrangement is that, as both separator and the first and second pumps are generally designed to operate at constant speed, the output of both pumps must be reduced, in the same proportion, when a lesser rate of separation is required, since reduction in the output of only the separator supply pump would result in an undesirable depression in the discharge chamber of the separator and impair the efficiency of separation.

According to the present invention an oil purification and separation plant for lubricating systems of machinery installations includes a centrifugal separator, a pump connected in the inlet flow line to the separator and having a rated output to enable it to pump oil to the separator at a rate corresponding with the acceptable separator throughput for efficient once through operation, hereinafter referred to as the rated throughput of the separator, a second pump being provided having a rated output at least equal to the first pump, conduit means connecting said second pump in the said inlet flow line for operation in parallel to the first pump, additional conduit means connecting said second pump with the discharge flow line from the separator, and control means for optionally connecting the said second pump to one or other of said conduit means.

With this arrangement with one pump in operation oil will be supplied to the separator so that it will operate at its said rated throughput, when however, both pumps are set to operate in parallel, oil will be fed to the separator at an increased flow rate so that the throughput will, for example, be double the normal rated capacity of the separator.

It is evident that, when continuously purifying a given quantity of oil in a force feed lubrication system, if a separator operating at its rated capacity achieves an extraction of say 99% of the impurities entrained in the oil for each pass through the separator and when operating at double its rated capacity, it achieves no higher percentage extraction than approximately 50%, the overall efficiency of separation out of the impurities from said given quantity of oil will not be impaired, as, in the latter case, twice the amount of oil will be passed through the separator in the same period of time as when the separator is operating at its rated capacity.

On the other hand experiments have shown that the efficiency of the separator to extract water and solid particles is not reduced pro-rata with the increase in the flow up to the maximum rate beyond which overflow of the separator would occur. In consequence, if a higher percentage efficiency of separation than 50% occurs at double the normal rated capacity of the separator, the overall efficiency of extraction will be greater than at the normal rate of throughput.

To enable the invention to be fully understood it will now be described with reference to the accompanying drawing which illustrates a diagrammatic form of one embodiment of the invention.

As shown in the accompanying drawing 1 is an oil drain tank into which drains oil which has been circulated through the machinery installation of, for example, a marine propulsion plant. 2 and 3 indicate inlet and outlet connections of the tank respectively.

A centrifugal oil separator is indicated at 4 and $a$, $a^1$, $a^2$, $a^3$, $a^4$ represent oil flow lines connecting the separator with the tank 1. A pair of pumps 5, $5^a$ is provided, and as shown, are driven by a common motor or prime mover 6. The suction side of the pump 5 is connected with the flow line $a$ by branch $b$ and its discharge side is connected to flow line $a^1$ by branch $b^1$. The suction and discharge sides of the pump $5^a$ are also connected to flow lines $a$, $a^1$ by branches $b^2$, $b^3$ respectively, which branches include multi-way valves $7^a$, $7^b$ adapted to be simultaneously actuated by a control member 8.

An oil heater 9 of any suitable kind is provided, its inlet $9^a$ being connected to flow line $a^1$ and its outlet $9^b$ to flow line $a^2$. Control valves $10^a$, $10^b$ enable the heater to be by-passed if desired, the valves being interconnected for operation by a control member 10.

The pump 5 is designed to have a rated output such as to pump oil to the separator at a rate to permit the latter to operate at its rated throughput capacity and the pump $5^a$ is designed to have an output capacity at least equal to that of the pump 5 and preferably slightly greater.

A clean oil storage tank 11 is connected by branches $11^a$, $11^b$, $12^a$ to the valve $7^b$ and an auxiliary clean oil storage tank 12 is connected through branch $12^a$ to the valve $7^b$.

The oil in the tank 1 is adapted to be circulated through the plant so that water, and solids entrained in the oil may be separated out in the separator 4, the clean separated oil being returned to the tank 1, or delivered to the clean oil storage tanks 11 or 12.

In the position shown in the accompanying diagram the valves $7^a$, $7^b$ have been adjusted to connect the suction sides of both pump $5^a$ with the flow line $a$ and the discharge sides with the flow line $a^1$. Accordingly when the motor 6 is operating and the cocks $5^c$ are open, both pumps will operate in parallel and draw oil from the tank 1 and feed it to the separator. Assuming that the oil in the tank 1 is below the temperature necessary to ensure efficient separation, it is passed through the heater 9 before entering the separator. The clean separated oil is discharged from the separator into the flow line $a^3$ and flows back into the tank 1.

As the output of each pump is equal to the rated throughput of the separator, it follows that with both pumps operating, the oil will be pumped at such a rate that the separator will operate at up to double its rated throughput. However, as previously explained, the overall efficiency of separation will not be impaired but will be improved, as in a given unit of time twice the quantity of dirty oil will be passed through the separator, than would be the case if the separator were operating at its normal rated capacity as at each such pass at the high flow rate the efficiency of separation will be not less than, and will probably exceed 50% of the efficiency at the lower once through rate.

Each of the valves $7^a$, $7^b$ is provided with ports which are open to the by-pass 19 when the valves are adjusted for parallel operation. The purpose of the by-pass is to enable the output of the pumps to be regulated when it is desired that the combined output of the two pumps working in parallel should be less than twice that of the rated output of each separator pump. This control is achieved by operation of a hand set valve $19^a$ which controls the amount of oil permitted to flow through the by-pass.

In certain circumstances it may be desired to deliver oil discharged from the separator to a higher level than the separator for example to the clean oil storage tank 11. In this case valve $7^a$ is adjusted to connect branch $b^2$ with branch $b^4$ leading from the flow line $a^3$, and valve $7^b$ is adjusted to connect branch $b^3$ with branch $12^a$. It will be noted that with the valves in this position the pump $5^a$ is isolated from the flow lines $a$, $a^1$. When both pumps are now operating and valve $v^1$ in flow line $a^4$ closed, only the pump 5 will pump oil from the tank 1 to the separator so that the latter will now operate at its rated capacity.

The clean oil discharged from the separator flows through flow line $a^3$ and branch $b^4$ to the suction side of pump $5^a$ and is pumped through branches $12^a$, $11^b$, $11^a$ to the clean oil storage tank 11, the valves $v^2$, $v^3$, $v^4$ and $v^{10}$ being closed. The tank 11 can be located at a much higher level than the separator as the pump $5^a$, serves to boost the pressure of the oil to raise it to the desired higher level. The drawback of prior arrangements, wherein it was necessary, if no special pump were provided, to locate the clean oil tanks below the level of the separator in order that the oil could flow thereto by gravity is, accordingly avoided.

The plant may also be used for purifying oil in a dirty oil tank such as 13 and in this case valve $v^7$ in the flow line $a$ will be adjusted to shut off the tank 1 and connect branch $13^c$ to the suction side of pump 5, valves $7^a$, $7^b$ being also adjusted to connect branch $b^2$ to branch $B^4$ and branch $b^3$ to $12^a$; valves $v^1$, $v^2$, $v^3$, $v^5$ and $v^{10}$ will be closed. Accordingly oil from tank 13 will be pumped by pump 5 to the separator, and pump $5^a$ will serve to deliver the oil discharged therefrom to the auxiliary clean oil storage tank 12 which may be at a higher level than the separator.

Further the plant may be used to purify and recirculate the lubricating oil used by parts of the machinery such as the turbo generators T, located at a higher level than the separator. In this case the oil discharged from the turbo generators flows into the branches $13^a$, $13^b$ and with the valves $7^a$, $7^b$ connected with branches $b^4$, $12^a$ and valves $v^1$, $v^3$, $v^4$, $v^5$ and $v^{10}$ closed and valves $v^2$ open, the pump 5 will pump the oil from branch $13^b$ to the separator, and pump $5^a$ will operate to feed the clean oil discharged from the separator back to the turbo generator lubricating system, through the branches $12^a$, $13^c$.

To enable the oil in the tank 1 to be heated up and its viscosity reduced before the machinery is started up, and so prevent the main pumps of the force feed lubricating system becoming overloaded the oil in tank 1 may be passed through the heater and separator and back to the tank 1 at a reduced flow rate by opening the flow valve $19^a$ to thereby reduce the combined output of the pumps.

Alternatively the oil could be circulated through the heater 9 without passing through the separator. For this purpose a branch $b^5$ is provided which is normally closed by a valve $v^6$. When this valve is opened and valves $7^a$, $7^b$ are adjusted to the position shown in the diagram, both pumps 5, $5^a$ will operate to draw oil from the tank 1 and pump it through the heater and through branch $b^5$, by passing the separator. This oil can be circulated in this manner until it attains the desired temperature and viscosity.

If it should be necessary to feed oil from tank 11 directly into the drain tank 1, this is readily effected by adjustment of valves $v^8$, $v^9$ and $v^{10}$ to permit the oil to flow through the branches $11^c$, $11^d$ and valve $v^3$ to the tank 1.

Further, oil in tank 11 can be recirculated through the separator if desired, by adjusting valves $v^8$ and $v^9$ to permit the oil to flow into the flow line $a$, the separated clean oil being returned to tank 11 or fed to tank 1.

As shown the separator is driven by a motor 14 and a drain 15 is provided for draining off water separated from the oil. 16, 17 indicate test cocks and drip trays for enabling test samples of oil to be taken for examination.

Preferably a solenoid operated valve 18 is provided in the flow line $a^2$ which is open when the separator is operating and closed automatically when it is not in use. The solenoid may be adapted to be connected in the electric circuit of the motor 14 so as to be energised only when the motor is running.

The pumps 5, $5^a$ are driven by a common continuously operating motor or prime mover but they may be independently driven, if desired.

Suitable protective strainers $f^1$, $f^2$, $f^3$ are provided in the flow and branch lines and as shown each pump has a safety relief valve $g^1$, $g^2$.

The arrangement, according to the present invention, has the important advantage that the separator may be adapted to operate at its rated capacity or at a much higher throughput to suit particular conditions, and further the second mentioned pump, when not required to feed oil to the separator, is readily connectable to the discharge side of the separator to pump the clean oil to parts of the lubricating system or to a storage tank at a higher level, and accordingly the separator need not be positioned at a high level relative to all portions of the system to allow for gravitational flow of the oil, but can be mounted at a low level relative to certain sections of the lubricating system, for example, adjacent to the oil sump. It will be noted that even when only one pump is operating to feed oil to the separator, the latter will be operating at its rated capacity.

A further advantage is that the pumps can be located at a low level in the plant to operate at drowned suction at all times. This is particularly advantageous when drawing cold viscous oil from a low level storage or drain tank.

I claim:
1. An oil purification and separation plant for lubricating systems of machinery installations, including a centrifugal separator having an inlet flow line communicating therewith a pump connected in the inlet flow line to the separator and having a rated output to enable it to pump oil to the separator at a rate to permit the latter to operate at its rated throughput capacity, a second pump having a rated output at least equal to the first pump, conduit means connecting said second pump in the said inlet flow line for operation in parallel to the first pump, additional conduit means connecting said second pump with the discharge flow line from the separator, and control means for optionally connecting the said second pump to one or other of said conduit means.

2. An oil purification and separation plant for lubricating systems of machinery installations, including a used oil sump, a centrifugal separator and a clean oil tank, a pump interposed between said sump and said separator and having a rated output to enable it to pump oil from the sump to the separator at a rate to permit the latter to operate at its rated throughput capacity, a second pump having a rated output at least equal to the first pump, conduit means connecting said second pump with said sump and said separator for operation in parallel to the first pump, additional conduit means connecting the suction side of said second pump with the discharge side of said separator, and the discharge side of said separator with said clean oil tank, and control valve means for optionally connecting the said second pump to one of said conduit means.

3. An oil purification and separation plant for lubricating systems of machinery installations, including a centrifugal separator having an inlet flow line and a clean oil tank both communicating with said separator, a pump connected with the inlet flow line to the separator and also connected to the discharge side of the separator and having a rated output to enable it to pump oil to the separator at a rate to permit the latter to operate at its rated throughput capacity, a second pump having a rated output at least equal to the first pump, conduit means connecting said second pump with the said inlet flow line of the separator for operation in parallel to the first pump, additional conduit means connecting said second pump with the discharge side of the separator and with the clean oil tank to pump oil that has passed through the separator to said clean oil tank and valve means for optionally connecting the said second pump to either of said conduit means.

4. An oil purification and separation plant for lubricating systems of machinery installations, including a centrifugal separator having an inlet flow line communicating therewith, a pump connected in the flow line of the lubricating system to pump oil to the separator at a rate to permit the latter to operate at its rated throughput capacity, a second pump having a rated output at least equal to the first pump, conduit means connecting said second pump in the said flow line for operation in parallel to the first pump to pump oil to the separator, additional conduit means connecting said second pump with the discharge side of the separator, for pumping oil passed through the separator back into the flow line of the lubrication system and valve means for optionally connecting the said second pump to one of said conduit means.

5. An oil purification and separation plant for lubricating systems of machinery installations, including a centrifugal separator having an inlet flow line communicating therewith, a pair of pumps each having a rated output at least equal to the rated throughput capacity of the separator, means for simultaneously driving both said pumps, conduit means connecting said pumps with the inlet flow line of the separator to permit them to operate in parallel to pump oil to said separator, additional conduit means for connecting the suction side of one of said pumps with the discharge side of the separator, and the discharge side of said separator with the flow line of the lubrication system, and control valve means for controlling the connection of the said one pump to said additional conduit means.

6. An oil purification and separation plant for lubricating systems of machinery installations, including an oil drain tank, a centrifugal separator having an inlet flow line communicating therewith and a clean oil tank, a pump having a rated output to enable it to pump oil to the separator at a rate to permit the latter to operate at its rated throughput capacity, means connecting the suction side of said pump with the drain tank and the discharge side with the inlet flow line of the separator, a second pump having a rated output at least equal to the first pump, conduit means connecting said second pump in series with drain tank, and the inlet flow line of said separator for operation in parallel to the first pump, additional conduit means connecting said second pump in series with the outlet side of said separator and the clean oil tank, and valve means for optionally connecting the second pump to one of said conduit means.

7. An oil purification and separation plant for lubricating systems of machinery installations, including a centrifugal separator having an inlet flow line communicating therewith a pump connected in the inlet flow line to the separator and having a rated output to enable it to pump oil to the separator at a rate to permit the latter to operate at its rated throughput capacity, a second pump having a rated output at least equal to the first pump, conduit means connecting said second pump in the said inlet flow line for operation in parallel to the first pump, additional conduit means connecting said second pump with the discharge flow line from the separator, control means for optionally connecting the said second pump to one of said conduit means, and an automatically controlled valve disposed in the inlet flow line of the separator and operable to shut off the supply of oil to the separator when the latter is not operating.

8. An oil purification and separation plant according to claim 7 wherein said separator is driven by an electric motor and said automatic valve is controlled by a solenoid connected with the circuit of said motor so that it is energised to open the valve so long as the motor is operating to drive the separator.

References Cited in the file of this patent

UNITED STATES PATENTS

| | | |
|---|---|---|
| 1,318,086 | Kennedy | Oct. 7, 1919 |
| 1,658,362 | Walker | Feb. 7, 1928 |
| 1,745,108 | McBerty | Jan. 28, 1930 |
| 1,788,911 | Clark | Jan. 13, 1931 |
| 2,077,799 | Jones | Apr. 20, 1937 |
| 2,322,772 | Pennebaker | June 29, 1943 |
| 2,367,851 | Eaton | Jan. 23, 1945 |
| 2,539,125 | Froding | Jan. 23, 1951 |